G. H. RICHARDS.
SERVICE RECORDING INSTRUMENT.
APPLICATION FILED AUG. 4, 1916. RENEWED FEB. 7, 1918.
1,259,906.
Patented Mar. 19, 1918.
3 SHEETS—SHEET 2.
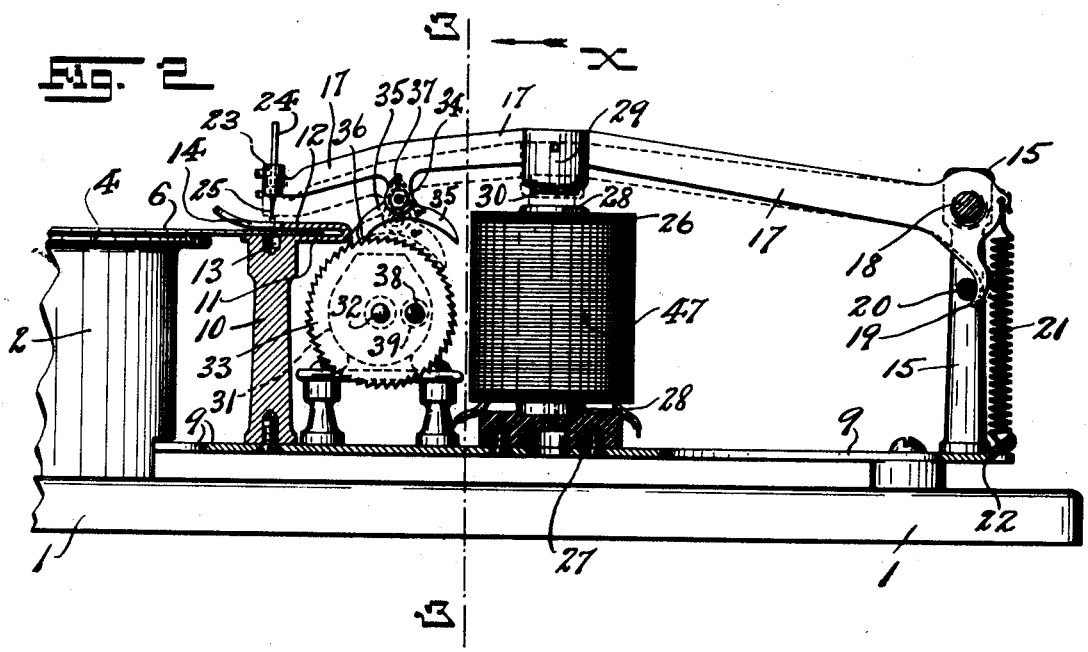
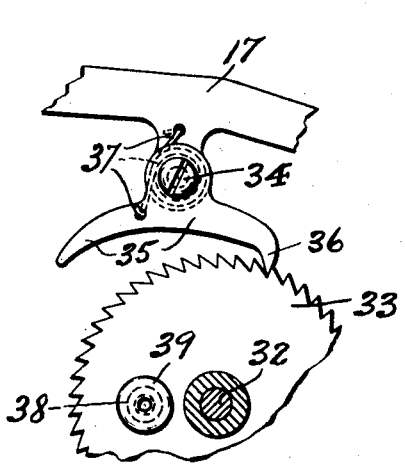
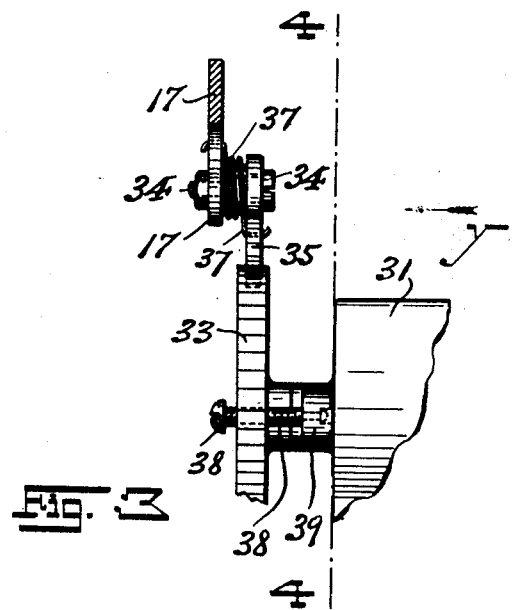
WITNESSES:
Fredk. H. W. Frautzel
Eva E. Desch.
INVENTOR
George H. Richards,
BY
Frautzel & Richards
ATTORNEYS G. H. RICHARDS.
SERVICE RECORDING INSTRUMENT.
APPLICATION FILED AUG. 4, 1916. RENEWED FEB. 7, 1918.

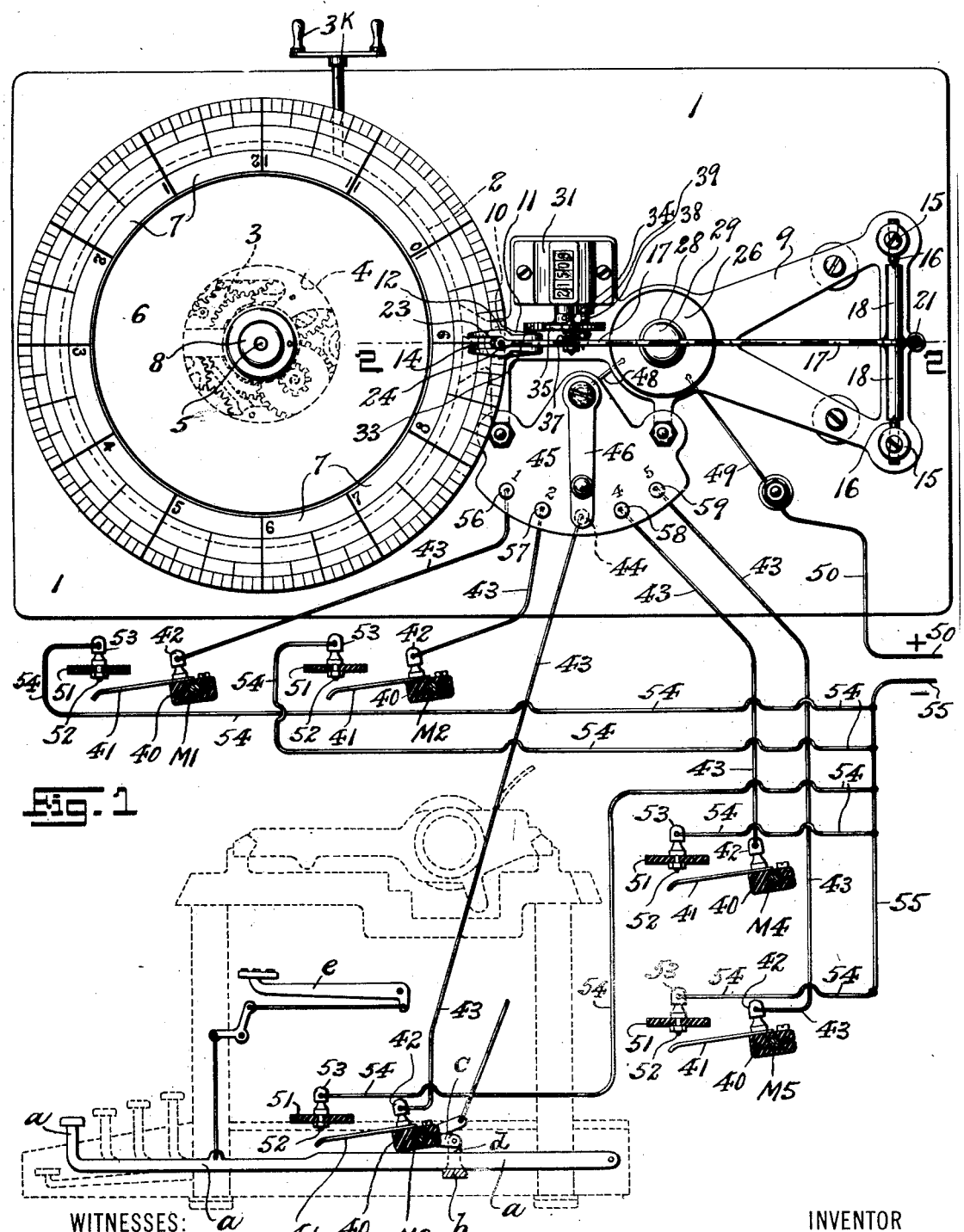

1,259,906.

Patented Mar. 19, 1918.

WITNESSES:
Frdk H. W. Frantzel
Eva E. Desch.

INVENTOR
George H. Richards,
BY
Frantzel and Richards
ATTORNEYS

UNITED STATES PATENT OFFICE.

GEORGE H. RICHARDS, OF NEW YORK, N. Y.

SERVICE-RECORDING INSTRUMENT.

1,259,906.  Specification of Letters Patent.  Patented Mar. 19, 1918.

Application filed August 4, 1916, Serial No. 113,040. Renewed February 7, 1918. Serial No. 215,921.

*To all whom it may concern:*

Be it known that I, GEORGE H. RICHARDS, a citizen of the United States, residing at New York, in the county of New York and State of New York, have invented certain new and useful Improvements in Service-Recording Instruments; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in recording instruments; and, the invention has reference, more particularly, to a novel construction of service recording instrument for use in connection with one or more typewriting machines, linotype machines, typesetting machines, calculating machines, or any other machines concerning the operation and service of which an accurate record is desired.

My present invention has for its principal object to provide a very simple, easily connected, and accurately operating service recording instrument of the character above mentioned, which may be electrically connected with a machine or machines of which a service record is desired, in such a manner that the recording instrument may be located at any desired distance away from the machine or machines whose service it is recording, as, for example, in the private office of the manager, superintendent, or department head under whose supervision the said machines and their operators are placed, thereby subjecting to the inspection of such, manager, superintendent or department head alone, (*i. e.* without the knowledge of the operators of the machines so tested,) the service records made by my novel recording instrument.

Further objects of my present invention are to provide a novel recording instrument for the purposes above indicated, which is so constructed and so operates, in connection with the machine or machines to be tested, that a record of the operator's work upon a tested machine, and the time required to perform such work, is rendered; that a record of the working value of the machine tested, as estimated by the amount of work which can be performed on it is obtainable; that a record of the wear and tear of the machine tested, especially as indicated in the consumption of supplies used therewith, (*e. g.* such as the consumption of ink ribbons, carbon-paper, etc., on a typewriting machine,) as well as a quality and service test of such supplies themselves, can be obtained; and that such records can be obtained which will serve as a check on those who are responsible for the work of the operators of machines tested so that such operators may be relieved of the charge of not being industrious if those by whom their work is supervised and controlled have not been properly doing so.

A still further object of my present invention is to provide a novel service recording instrument which may be arranged to give a simultaneous individual service record of a plurality of machines, or which may be so arranged as to be easily and quickly selectively connected with any one of a given group of machines, without the operators of such machines knowing which one of the group is selected for test, or the time or times when such tests are being made in the form of the service records rendered by my novel recording instrument.

Other objects of the present invention, not at this time more particularly enumerated, will be clearly understood from the following detailed description of the present invention.

With the various objects of my present invention in view, the same consists, primarily, in the novel construction of service recording instrument hereinafter set forth; and the invention consists, furthermore, in the several novel arrangements and combinations of the various devices and parts, as well as in the details of the construction of said devices and parts, all of which will be more fully described in the following specification, and then finally embodied in the claims which are appended to and which form an essential part of the said specification.

The invention is clearly illustrated in the accompanying drawings, in which:—

Figure 1 is a plan view of one form of my novel service recording instrument, made according to and embodying the principles of my present invention, and combined with said plan view is a diagrammatic representation of one form of electrical connections and circuits through which said recording instrument is connected with a plurality of machines the service of which is to be recorded.

Fig. 2 is a detail longitudinal vertical section, taken on line 2—2 in said Fig. 1, and drawn on an enlarged scale.

Fig. 3 is a detail transverse section taken on line 3—3 in said Fig. 2, looking in the direction of the arrow $x$, said view being drawn on a still further enlarged scale.

Fig. 4 is a detail cross section taken on line 4—4 in said Fig. 3, looking in the direction of the arrow $y$.

Similar characters of reference are employed in all of the hereinabove described views, to indicate corresponding parts.

Figure 5:
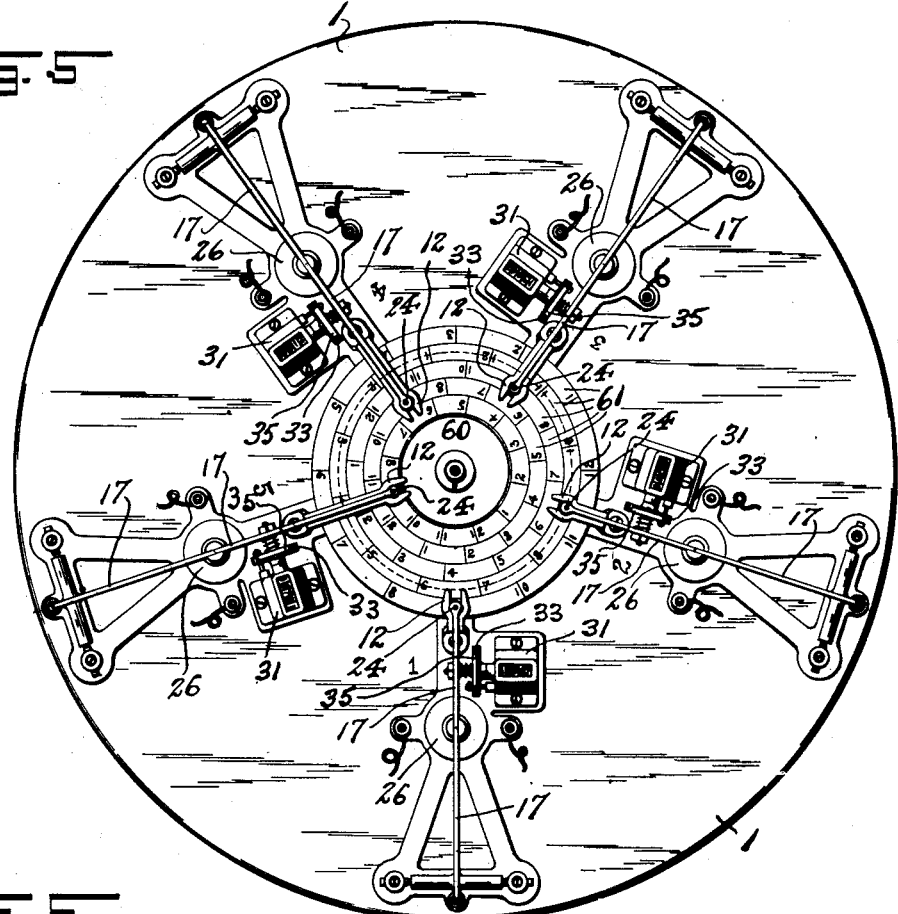
Figs. 5 and 6 are respectively plan views of slightly modified constructions of my novel service recording instrument, still made according to and embodying the principles of my present invention, but showing the same as arranged to produce a simultaneous service record of a plurality of machines adapted to be connected therewith.

Referring now to said drawings, the reference character 1 indicates a suitable base upon which the novel structure of my recording instrument is mounted. Secured upon said base 1, in a convenient location, is a casing 2 which incloses a clock-work 3 provided with a winding-key and spindle $3^K$. Extending upwardly through the top 4 of said casing 2 is the hour spindle 5 of said clock-work 3, the same being rotated by the said clock-work once in every twelve hours. The top 4 of said casing 2 provides a table upon which is placed a time-record sheet or disk 6, the same being preferably made of paper or some such easily perforatable material. Said time-record sheet or disk is preferably of circular form, and is provided with graduations about its marginal edge which divides the circumference thereof into twelve hour spaces 7, which are in turn subdivided to provide lesser time spaces if desired. For example, as shown in Fig. 1, the time-record sheet or disk 6 is provided with hour spaces 7 which are subdivided so that half-hour, quarter-hour and five minute spaces are provided. Said time-record sheet or disk 6 is centrally disposed upon said hour spindle 5 of the clock-work 3, and suitably secured thereto by any desirable form of coupling device 8, whereby said time-record sheet or disk 6 is rotated by said clock-work 3 once in twelve hours.

Also secured upon said base 1 is a supporting plate or frame-member 9. Mounted upon said plate or frame-member 9, adjacent to said clock casing 2 is an anvil-post 10, across the upper end surface of which the graduated marginal edge of said time-record sheet or disk 6 passes, as said time record sheet or disk 6 is rotated by the clock-work 3. Connected with the upper end of said anvil-post 10 is a retaining arm 11, which is doubled upon itself so that its upper forward end 12 extends back across the upper surface of said marginal edge of the time-record sheet or disk 6, thus retaining the same against upward lifting movement away from the surface of said anvil-post 10. Said anvil-post 10 is further provided with a countersunk portion or opening 13, which is thus situated beneath the marginal edge of said time record sheet or disk 6. The free end 12 of said retaining arm 11 is preferably bifurcated to provide a slot 14 which registers above said depression or opening 13 of said anvil-post 10.

Secured upon said plate or frame-member 9, at its rearward end, are a pair of standards 15, suitably spaced one from the other. Secured in the upper end of each standard 15 is an adjustable pivot-bearing 16.

The reference character 17 indicates a vibrator-arm which is provided at its rearward end with oppositely extending transverse journal-portions 18, which engage said pivot-bearings 16, to suitably fulcrum said vibrator-arm 17 between said standards 15. Said vibrator-arm 17 is provided, at its rearward end, with a stop-finger 19, which normally engages a transverse stop-rod 20 mounted to extend between said standards 15. Said vibrator-arm 17 is maintained in normal lifted position, and returned to such normal position after operation, by means of a pull-spring 21 connected between its rearward end and an anchor-lug 22 formed in said plate or frame-member 9. The forward free end of said vibrator-arm 17 terminates in a socket-portion or stylus-holder 23, in which is secured a downwardly extending perforating-needle or stylus 24, the sharpened or pointed end 25 of which is directed toward that portion of said time-record sheet or disk 6 which is registered above said anvil-post 10. The downward oscillations or vibrations of said vibrator-arm 17 carries downward said perforating needle or stylus 24 into perforating contact with said time-record sheet or disk 6, the pointed or sharpened end 25 of said perforating needle or stylus being adapted to pass through the slot 14 formed in said free end 12 of the retaining arm 11, thence through the paper of the time-record sheet or disk 6 with perforating effect at that point of the latter supported by said anvil-post 10, the depression or opening 13 of said anvil-post receiving said pointed end of the stylus so that the same is not dulled or battered by contact with the rigid body of the anvil-post. Of course, it will be understood that an equivalent of said depression or opening 13 would be provided by a yielding or perforatable material located in or on said anvil-post 10 in the path of the descending stylus, and beneath the body of said time-record sheet or disk passing thereover.

The means for causing the vibrations or oscillations of the vibrator-arm 17 comprises an electro-magnet 26, which is mounted fixedly upon said plate or frame-member 9, and insulated therefrom by means of any desirable form of insulator-block 27 to which the electro-magnet is secured, and which is in turn secured to said plate or frame-member 9. Secured to said vibrator-arm 17, so as to be registered above the magnetic core 28 of said electro-magnet 26, is an insulator-piece 29, in the lower end of which is fixed a magnetic armature 30, thus insulating said armature 30 from said vibrator-arm 17, which is a preferable construction although not absolutely essential to a proper operation of the device. It will be readily understood that every time the electro-magnet 26 is electrically excited or energized it will exert a downward pull upon the armature 30, which will in turn pull downward the vibrator-arm 17, thus imparting thereto a downward oscillation or vibration which will carry its perforating-needle or stylus 24 into perforating contact with the time-record sheet or disk 6. It will also be understood that when the electro-magnet 26 is neutralized or deënergized its attractive power will cease to influence said armature 30, and consequently the pull-spring 21 will return said vibrator-arm 17 to normal initial position, and will withdraw the perforating-needle or stylus 24 thereof from perforating engagement with said time-record sheet or disk 6. Consequently the successive making and breaking of the electric circuit serving the electro-magnet 26 will cause a synchronous vibration of said vibrator-arm, and by relating an electric circuit make and break device to operative parts of a machine to be tested, it follows that such operative impulses transmitted by the operator to such machine will be faithfully and synchronously recorded by the stylus 24 upon the time-record sheet or disk 6, for such period of time as the operation of the machine is continued by said operator. All of which will subsequently be more fully described, as an illustrative example, by showing the operation of my novel device when the same is properly connected electrically with typewriting machines.

Mounted in a convenient location upon said plate or frame-member 9, and affixed thereto in any suitable manner, so as to be properly adjacent to said vibrator-arm 17 is a mechanical counter or total-adder 31, which may be of any well known commercial type, or may be especially constructed if desired. Fixed upon the rotary shaft 32 of said counter is a ratchet-wheel 33. Secured to said vibrator-arm 17, so as to extend from one side thereof toward said counter 31, is a fulcrum stud 34 upon which is pivotally mounted a pawl 35, the nosing 36 of which operatively engages the teeth of said ratchet-wheel 33. Said pawl 35 is maintained in this operative engagement with said ratchet-wheel 38 by means of a suitable pressure spring 37 which tends to rotate the pawl in such a direction as to constantly direct its nosing 36 toward said ratchet-wheel 33, as will be readily understood. It will be apparent from an inspection of the drawings, that, when the vibrator-arm 17 is caused to oscillate in a downward direction, the nosing 36 of the pawl 35 will be also swung downwardly, and in thus moving downward will press with rotating effect upon said ratchet-wheel 33 and thus impart a slight movement thereto, the nosing of the pawl following the movement of the ratchet-wheel 33 by reason of its pivoted relation to the vibrator-arm 17. When the vibrator-arm 17 swings upwardly again said pawl 35 and its nosing 36 rides over said ratchet-wheel in the opposite direction, without moving the latter, while said pawl is thus being retracted to normal initial position and in initial engagement with the next following ratchet-tooth. It will thus be apparent that, at every complete oscillation or vibration of said vibrator-arm 17, a partial rotary movement is imparted to said counter mechanism shaft 32, so that the number of vibrations or oscillatory movements of the vibrator arm are progressively recorded by the counter mechanism. Since the number of oscillations of the vibrator-arm 17 corresponds to the number of operative impulses imparted to a machine with which my device is connected, it will be readily understood that the total number registered by the counter mechanism can readily be interpreted or analyzed in terms of quantity of work performed by the operator upon the machine tested, which taken in connection with the time required for the performance of such work, as indicated upon the time-record sheet or disk 6, in the manner above described, readily gives a very accurate record of the service performed by both the machine tested and by the operator for such machine. Since in some types of machines in the operation of which a very large number of operative impulses are transmitted by the operator thereto, and since to burden the counter-mechanism with the duty of recording each unit impulse on its dials or counting wheels would require extra capacity counter-mechanism, it may be desirable to so relate the counter mechanism to the vibrator-arm 17 that a plurality of oscillations thereof, say in multiples of five or ten, cause but one unit movement and indication of the dials or counter wheels of the counter-mechanism. This may be accomplished in the following manner: If the counter mechanism produces one unit movement of its counter wheels to every tenth revolution of its driving-shaft, then the ratchet-wheel 33 is provided with fifty teeth, so that every five oscillations of the vibrator-arm 17 will be transmitted to the counter-mechanism to produce a recording unit movement thereof; in other words the ratio of the number of ratchet-teeth on the ratchet-wheel 33 to the unit movement of the counter-mechanism will be five to one. If the ratio of the number of ratchet-teeth on the ratchet-wheel 33 to the unit movement of the counter-mechanism is ten to one, it will then be apparent that it will require ten oscillations of the vibrator-arm 17 to produce one unit movement of the counter-mechanism. Of course, the ratio established between the operation of said vibrator-arm 17 and the counter-mechanism may be any ratio desired. For example, if my service recorder is used in connection with typewriting machines, and it is predetermined that the average number of letters per word written on a typewriter is seven, then the ratio of the number of oscillations of the vibrator-arm 17 (each oscillation thereof representing or synchronizing with a letter writing stroke on the key-board of said typewriter) to the unit movement of the counter mechanism may be placed at seven to one, consequently the total figure recorded by said counter mechanism, after the writing has been completed, will give approximately the number of words written by the operator, and the time-record sheet or disk will give the time required to write that number of words.

In order to prevent any carrying over of the ratchet-wheel 33, when the same is operated by the pawl 35, beyond the distance or length of movement to be properly transmitted thereto by an oscillation of said vibrator-arm 17, and to further prevent any backward drag or reverse rotation of the ratchet-wheel 33 while the pawl 35 is being retracted to normal initial position by the upward movement of the vibrator-arm, I provide in connection with said ratchet-wheel 33 a momentum stop device. This device comprises, preferably, an adjustable screw-threaded shank 38, which passes transversely through the body of said ratchet-wheel in screwing relation thereto. Supported on the free end of said shank 38 is a friction-brake 39, which may be adjusted by turning said shank 38, to frictionally engage, to the proper degree of resistance, the end of the counter-mechanism casing, over which said brake is caused to move by the rotation of said ratchet-wheel. Of course, I am aware that there are many other forms of momentum stops that may be used in this connection, consequently I do not wish to limit myself alone to the form of such device immediately above described.

Referring now more particularly to Fig. 1 of the accompanying drawings, I have illustrated therein one form of my novel service recording instrument, and the electrical connections therefor, adapted to associate the same operatively with typewriting machines. And in this connection it must be remembered, that I do not limit the use of my device particularly to typewriters, since it is easily adapted for use with many other kinds of machines. But I have selected the typewriting machine because it is peculiarly adapted to render a very clear understanding of and illustration of the use and functions of my service recording instrument. In the said Fig. 1 the reference character $M^3$ indicates the universal rocking-bar of the third typewriting machine in a group of five. Said rocking-bar $M^3$ is oscillated by the depression of each key-bar $a$, through the yoke-bar $b$ over which all the key-bars $a$ extend, and which is connected with the rocking-arms $c$ of said rocking-bar $M^3$ by means of the suspension links $d$. Each key-bar $a$ is adapted to operate a type-bar $e$ in the usual manner. $M^1$ indicates the rocking-bar of the first typewriting machine of said group. $M^2$ indicates the rocking-bar of the second typewriting machine of said group. $M^4$ indicates the rocking-bar of the fourth typewriting machine of said group, and $M^5$ indicates the rocking-bar of the fifth typewriting machine of said group. Mounted on the rocking-bar $M^3$ of the third typewriting machine is an insulator block 40 upon which is secured the movable member or vibrating contact 41 of an electrical make and break device. Said vibrating contact 41 is provided with a binding-post or terminal 42 to which is connected an electric conductor 43 leading to a switch contact piece 44 of an electric switching device 45 associated with my novel service recording instrument. The movable switch-arm 46 of the switching device 45 is connected with one end of the winding 47 of said electromagnet 26 by the conductor 48, and the other end of said winding 47 of the electromagnet 26 is connected by the conductor 49 with the incoming electric service line 50 leading from any suitable source of electric current. Secured upon some stationary point of said typewriting machine, such as its frame, and in proper juxtaposition relative to said vibrating contact 41, is an insulator-block 51, in which is mounted a stationary member or fixed contact 52, connected with which is a binding-post or terminal 53. Connected with said binding-post or terminal 53 is an electric conductor 54 which leads to the return or outgoing electric service line 55 which returns to the source of electric current. Each of the other machines of the group, as represented by their rocking-bars M¹, M², M⁴ and M⁵, are provided with similar make and break contact devices and electric conductors, to which similar letters of reference are applied in order to avoid a repetition of description. The movable or vibrating contact of the first machine of the group, represented by the rocking-bar M¹, is electrically connected with the switch contact piece 56, that of the second machine of the group is connected with the switch contact piece 57, that of the fourth machine is connected with the switch contact piece 58, and that of the fifth machine is connected with the switch contact piece 59, thus each machine of the group is represented by its individual contact piece on the switching device 45. It will therefore be apparent that any selected individual typewriting machine of the group may be operatively and electrically connected with my service recording device by selectively positioning the switch-arm 46 upon the switch contact-piece 56, 57, 44, 58 or 59, as the case may be, which leads to the make and break device connected with that machine, and consequently when one machine is thus connected with the service recording device, the remaining machines are disconnected therewith. It follows that the operators of the group of machines will not be able to tell whether they or their machines are being tested or not, and to further aid against discovery of such fact, the make and break devices on each machine may be covered or inclosed so that the electrical functioning of the same may not be disclosed by sparking at the contacts, should such sparking occur. As illustrated in Fig. 1, the third machine of the group is operatively connected with my service recorder. Assume that this connection is made at nine o'clock, and the operator of such machine begins work at that time. The time-record sheet or disk 6, being properly connected with the hour spindle of the clock-work 3, has turned so that the nine o'clock hour graduation thereof is registered beneath the stylus 24. Now as the operator proceeds with the work, the vibrator-arm 17 vibrates synchronously with the impact of each type-bar of the machine, and as the clock-work rotates the disk, a line of perforations will be formed in said time record sheet or disk. The termination of the line of perforations will, when compared with the graduations of the disk 6 adjacent thereto, indicate the time the operator ceased work, and a reading of the counter-mechanism will indicate the quantity of work performed by said operator in that period of elapsed time, in the manner already above explained. As the operator strikes each key-bar and depresses the same to throw up the type-bar, the rocking-bar M³ is oscillated, as will be understood, and since the vibrating contact 41 is connected with said rocking-bar, each oscillation of the latter will cause a corresponding oscillation of the former which will carry it into circuit closing contact with said fixed contact 52, thus closing the electric circuit through the electromagnet 26 to energize the same, whereby a synchronous oscillation of said vibrator-arm 17 and its stylus 24 is caused, as above described. As the operator releases the struck key-bar, and it returns to normal initial position, the rocking-bar also resumes normal position thereby separating the vibrating contact 41 from the fixed contact 52, and consequently breaking the electric circuit to deënergize said electro-magnet 26, so that the spring of said vibrator-arm 17 will retract the same and its stylus to initial position. Of course, it will be understood that the vibrating contact 41 may be secured to any universally moving part of a typewriter, or any other machine, which will serve as a fitting location therefor in view of its required functioning, hence I do not limit myself to its use on the rocking-bar or any other particular part of a typewriting or other machine, so long as it is secured in a position to function synchronously with such operations of the machine as it is desired to use a basis of the service record.

Referring now more particularly to Fig. 5 of the accompanying drawings, I have illustrated therein a slightly modified construction of my novel service recording instrument, the same being so modified and arranged as to be adapted to render a simultaneous individual service record of a plurality of machines connected therewith, such records being made upon a single time-record sheet or disk. In this construction I provide the single clock-driven time-record sheet or disk 60, which is concentrically subdivided into a plurality of record spaces 61, corresponding in number to the number of machines of which service records are desired. Each record space 61 is divided into hour sections or spaces, and the latter may be subdivided to indicate lesser time spaces in any manner desired. Mounted upon the base 1, so as to be radially disposed and equidistant from each other, are a plurality of vibrator-arms 17 and operating mechanism connected therewith of the character above described (as will be apparent by reference to the reference numerals applied in Fig. 5 to indicate the similar parts thereof). The stylus carried by each vibrator-arm 17 is positioned to register over and operate within one of the record spaces 61, each stylus working in a different record space, and the respective vibrator-arms carrying said styluses varying in length to accommodate the latter to such various positions. Of course, it will be understood that the number of vibrator-arms 17 thus arranged, and the number of record spaces 61 with which such arms coöperate, may be increased or decreased within reasonable limits to serve a corresponding number of machines. In the drawing I have illustrated the device as adapted to serve five machines, and consequently have provided five vibrator-arms 17 coöperating with five record spaces 61 on the time record sheet or disk 60. Since the vibrator-arms 17 are radially disposed and spaced one from the other in consequence of such disposition, the hour spaces of each record space 61 are variously positioned so that the same hour space is registered beneath each stylus as the time record sheet or disk 60 is revolved. Each vibrator-arm mechanism may be numbered, so that the electro-magnet 26 serving the vibrator-arm mechanism 1 may be connected with the make and break devices of the first machine of the group served, and the electro-magnet of the vibrator-arm mechanism 2 may be connected with the make and break mechanism of the second machine of the group served, and so on throughout the series. It will thus be apparent, without further explanation, that as the several machines of the group are operated an individual record of the performance of each machine will be simultaneously registered upon my novel service record instrument.

Figure 6:
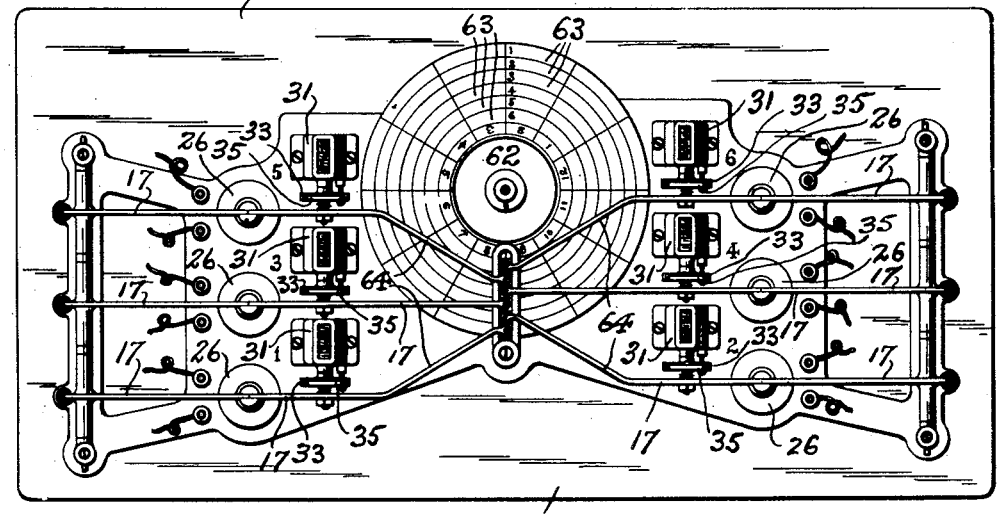

Referring now to Fig. 6 of the accompanying drawings I have illustrated there in a still further modified construction of my service recording instrument adapted to render a simultaneous individual service record of a plurality of machines connected therewith. In this construction I provide the single clock-driven time-record sheet or disk 62, which is concentrically divided into a plurality of record spaces 63, corresponding in number to the number of machines of which service records are desired. In this construction the vibrator-arm devices are arranged upon the base 1 in banks or series on each side of the time-record sheet or disk 62, and the arms are bent, as at 64, to position the styluses of the same in alinement over the time-record sheet or disk. By this arrangement the styluses are so positioned that the record spaces 63 of the time-record sheet or disk 62 may be arranged so that their corresponding hour spaces are parallel one with another, and all begin at the same point or radius of the time record sheet or disk. In all other respects this construction operates and conforms generally to the construction shown in Fig. 5, and is used in substantially the same manner.

I am aware that some changes may be made in the arrangements and combinations of the various parts of my device, as well as in the details of the construction of the same, without departing from the scope of my present invention as described in the foregoing specification, and as defined in the claims appended hereto. Hence, I do not limit my present invention to the exact arrangements and combinations of said parts as hereinabove described, nor do I confine myself to the exact details of the construction of said parts as illustrated in the accompanying drawings.

I claim:—

1. In a device of the kind described, the combination with a clock-driven time-record sheet of a pivoted vibrator-arm, marking means carried by said vibrator-arm and registered over said time-record sheet, an electro-magnet, an armature on said vibrator-arm adjacent to said electro-magnet, an electric circuit serving said electro-magnet, circuit make and break devices connected with a machine to be tested and adapted to be operated by the working movements of said machine to produce synchronous vibrations of said vibrator-arm whereby said marking means is carried into recording contact with said time-record sheet, a counter mechanism having a driving shaft, a ratchet-wheel mounted on said shaft, a pawl pivoted to said vibrator-arm and coöperating with said ratchet-wheel.

2. In a device of the kind described, the combination with a clock-driven time-record sheet of a pivoted vibrator-arm, marking means carried by said vibrator-arm and registered over said time-record sheet, an electro-magnet, an armature on said vibrator-arm adjacent to said electro-magnet, an electric circuit serving said electro-magnet, circuit make and break devices connected with a machine to be tested and adapted to be operated by the working movements of said machine to produce synchronous vibrations of said vibrator-arm whereby said marking means is carried into recording contact with said time-record sheet, a counter mechanism having a driving shaft, a ratchet-wheel mounted on said shaft, a pawl pivoted to said vibrator-arm and coöperating with said ratchet-wheel, and a momentum stop means connected with said ratchet-wheel.

3. In a device of the kind described, the combination with a clock-driven time-record sheet of means for marking said sheet, electro-magnetic means for operating said marking means, an electric circuit serving said electro-magnetic means, a plurality of machines to be tested, circuit make and break devices connected with each machine to be tested and adapted to be operated by the working movements of said machine for the purposes specified, and an electric switch in said electric circuit having contact pieces severally connected with said circuit make and break devices of said plurality of machines to be tested whereby said switch may be operated to selectively include in said electric circuit said make and break devices of any one of said machines to be tested.

4. In a device of the kind described, the combination with a clock-driven time-record sheet of a pivoted vibrator-arm, a stylus carried by said vibrator-arm and registering over said time-record sheet, means for supporting said time-record sheet against the operative contact of said stylus, spring-means for maintaining said vibrator-arm and its stylus in normal initial position, stop means for determining the normal initial position of said vibrator-arm, an electro-magnet, an armature on said vibrator-arm adjacent to said electromagnet, and electric circuit serving said electro-magnet, a plurality of machines to be tested, circuit make and break devices connected with each machine to be tested and adapted to be operated by the working movements of said machine for the purposes specified, an electric switch in said electric circuit having contact pieces severally connected with said circuit make and break devices of said plurality of machines to be tested whereby said switch may be operated to selectively include in said electric circuit said make and break devices of any one of said machines to be tested, a counter mechanism having a driving shaft, a ratchet-wheel mounted on said shaft, a pawl pivoted to said vibrator-arm and coöperating with said ratchet-wheel.

5. In a device of the kind described, the combination with a clock-driven time-record sheet of a pivoted vibrator-arm, a stylus carried by said vibrator-arm and registering over said time-record sheet, means for supporting said time-record sheet against the operative contact of said stylus, spring-means for maintaining said vibrator-arm and its stylus in normal initial position, stop means for determining the normal initial position of said vibrator-arm, an electro-magnet, an armature on said vibrator-arm adjacent to said electro-magnet, an electric circuit serving said electro-magnet, a plurality of machines to be tested, circuit make and break devices connected with each machine to be tested and adapted to be operated by the working movements of said machine for the purposes specified, an electric switch in said electric circuit having contact pieces severally connected with said circuit make and break devices of said plurality of machines to be tested whereby said switch may be operated to selectively include in said electric circuit said make and break devices of any one of said machines to be tested, a counter mechanism having a driving shaft, a ratchet-wheel mounted on said shaft, a pawl pivoted to said vibrator-arm and coöperating with said ratchet-wheel, and a momentum stop means connected with said ratchet-wheel.

In testimony, that I claim the invention set forth above I have hereunto set my hand this 2nd day of August, 1916.

GEORGE H. RICHARDS.

Witnesses:
  GEORGE D. RICHARDS,
  CHAS. H. PRATT.